United States Patent [19]
Chambers et al.

[11] 4,125,764
[45] Nov. 14, 1978

[54] TRANSVERSAL CORRELATOR ERROR DETECTOR

[75] Inventors: Ramon P. Chambers, Clearwater; Robert S. Gordy, Largo; David E. Sanders; Cameron E. Morrison, both of St. Petersburg, all of Fla.

[73] Assignee: E-Systems, Inc., Dallas, Tex.

[21] Appl. No.: 820,931

[22] Filed: Aug. 1, 1977

[51] Int. Cl.² .................................................. G06F 11/30
[52] U.S. Cl. .................................................. 235/302
[58] Field of Search ............... 307/204, 219, 221 R; 235/301, 302, 302.2; 364/737, 841, 728, 754, 760; 340/146.1 R, 146.1 BE, 146.1 F

[56] References Cited
U.S. PATENT DOCUMENTS

| | | | |
|---|---|---|---|
| 3,619,584 | 11/1971 | Gilbert | 235/301 |
| 3,924,181 | 12/1975 | Alderson | 235/302 |

*Primary Examiner*—Benedict V. Safourek

[57] ABSTRACT

A correlator error detector generates a first repeating digital pseudo noise code signal which is compared in a correlator to a second signal generated by the error detector with the second signal having the same pseudo noise code but with a noise signal intentionally added. The error detector measures the capability of the correlator to correlate the first signal with the second signal under varying noise conditions. Errors produced by the correlator are counted, and classified as being either missed correlation outputs or false correlation outputs.

38 Claims, 4 Drawing Figures

TRANSVERSAL CORRELATOR ERROR DETECTOR

BACKGROUND OF THE INVENTION

This invention relates to spread spectrum communications using pseudo noise codes and more particularly to the synchronizing of a locally generated pseudo noise code to that of the transmitted code.

In spread spectrum communications utilizing pseudo noise codes the receiving unit must generate a pseudo noise code to be synchronized with the pseudo noise code in the received signal. This synchronization process is accomplished before data can be transmitted over the communications link. The ability to synchronize and the speed at which synchronization can be accomplished are critical factors in the communications process and both are substantially dependent upon the level of noise energy present in the input signal. Therefore, it is necessary to know the amplitude of noise levels under which the correlation synchronization process can function.

In accordance with the present invention there is provided an apparatus for measuring the quantity and types of errors that are generated during the synchronization process as a function of the noise level that is added to the transmission medium. The noise level can be varied to permit the generation of a quantitative functional relationship between the noise present in the signal and the errors produced by the correlator.

SUMMARY OF THE INVENTION

The present invention comprises a correlator error detector which measures the quantity and type of errors produced by a correlator during the synchronization process. Means are provided for injecting a variable amplitude noise signal into the pseudo noise code input signal to the correlator. Additional means are provided for detecting a failure of said correlator to produce a correlation output in response to a sequence of the pseudo noise code input and for detecting a correlation output that is present but does not correspond to a sequence of the pseudo noise code input.

BRIEF DESCRIPTION OF THE DRAWINGS

For a more complete understanding of the present invention and the advantages thereof, reference is now made to the following description taken in conjunction with the following drawings.

DETAILED DESCRIPTION OF THE INVENTION

Figure 1:
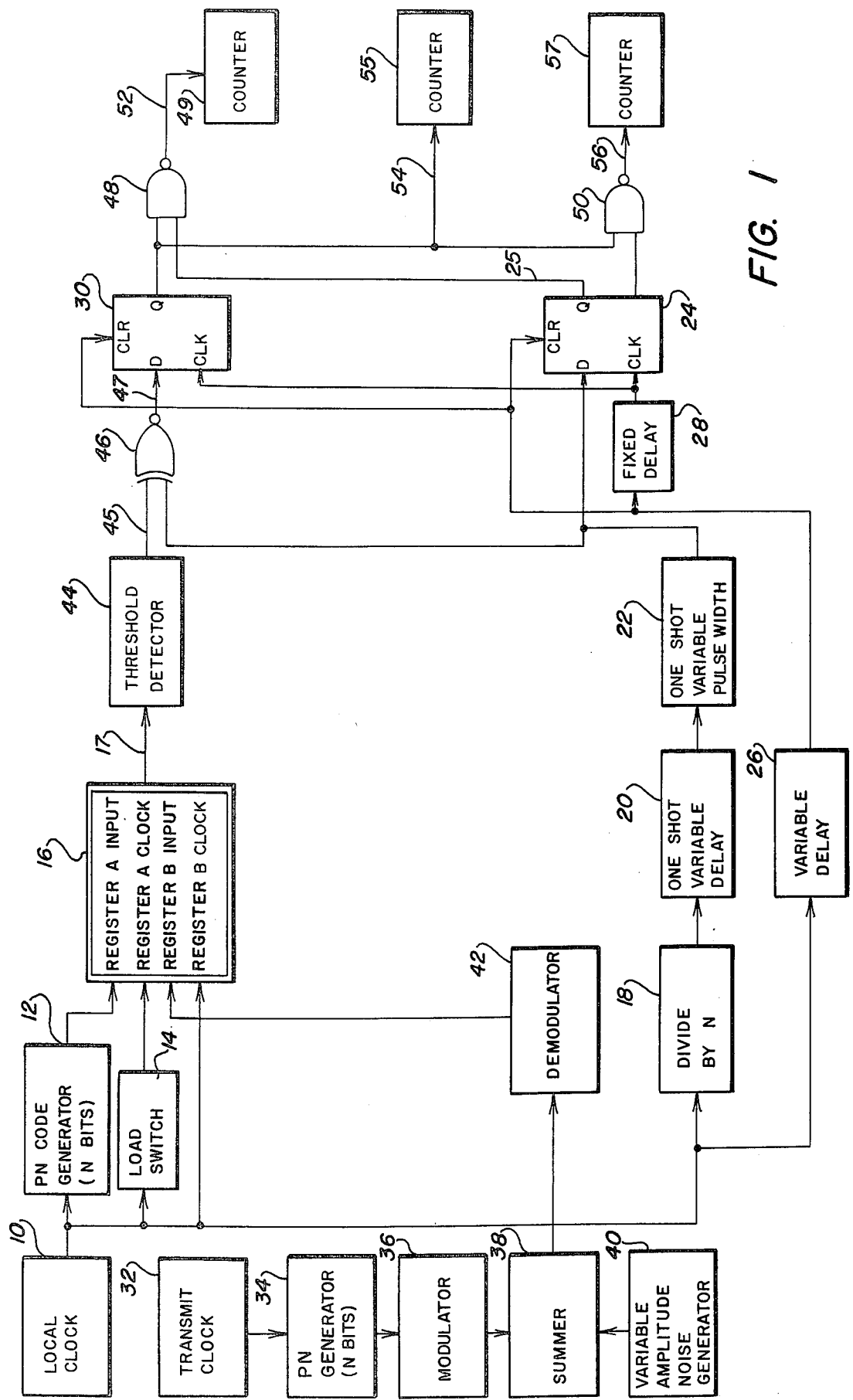
FIG. 1 is a block diagram of the present invention.

FIG. 1 is a block diagram of a correlator error detector in accordance with the present invention. A local clock 10 generates a clock signal which is provided as an input to a pseudo noise code generator 12 which in turn supplies an N-length digital code to the register A input of a correlator 16. This clock signal is also provided to the register B clock input of the correlator 16 and to the register A clock input through a load switch 14.

Pseudo noise code generator 12 is a digital circuit tht produces a binary code sequence comprising N bits. The order of occurrence of bits within the sequence remains essentially the same, and the sequence as a whole is continuously repeated to generate a steady stream of binary digits. The code sequence is pseudo-random in the sense that it satisfies the following three randomness properties. (1) The balance property; in each period of the sequence the number of "ones" differs from the number of "zeros" by no more than one. (2) The run property; where a run is a series of identical bits, one half of the runs of each kind, "ones" and "zeros", are of length one, one-fourth of each kind of length two, one-eighth of length three, etc. (3) The correlation property; when a period of the sequence is compared, term by term, with any cyclic shift of itself, the number of agreements differs from the number of disagreements by at most one. This is for any relationship except alignment of the two sequences.

Correlator 16 is a digital device which compares two sequences of digital data streams in a parallel fashion. Code sequences are carried in the registers A and B each of which contains M bits of digital data. Each register contains cells 1 through M with a single bit, one or zero, in each cell. Corresponding cells in the two registers are connected to exclusive-OR comparators which generate an output when the bits are the same. Thus, there are M exclusive-OR comparators wherein each bit in register A is compared to the corresponding bit in register B. The outputs of the comparators are summed to produce a single resulting voltage which is termed the correlation output. This output will be essentially a zero voltage except when the code sequences are aligned in parallel in the two registers, and at this time each bit in register A is the same as the bit in the corresponding cell of register B. When the code sequences are aligned a correlation output pulse is generated. The clock signals for registers A and B determine the rate that the digital signals are shifted through the respective registers and in the present invention these rates are the same. A particular correlator of this type is a model 64BC-III, LSI, manufactured by TRW Corporation. Another type of correlator which can be utilized in the present invention is one that utilizes a charge coupled device. Also, for the embodiment shown in FIG. 1, a surface acoustic wave device can be used for the correlator.

The output of the correlator 16 is conveyed to a threshold detector 44 and the output signal of the threshold detector is provided as one input to an exclusive-OR gate 46. From the exclusive-OR gate 46 the output is provided to the D input of a flip-flop 30 and the Q output of this flip-flop is provided as one input to a NAND gate 48 and is also conveyed to a counter 55. The output pulses generated by the NAND gate 48 are conveyed to a counter 49.

The clock signal output of the local clock 10 is provided as an input to a divide-by-N circuit 18 which produces a subdivided clock output that is provided to a one shot variable delay circuit 20 and the output of circuit 20 is provided to a one shot variable pulse width circuit 22. Circuit 20 produces a single pulse output in response to an input signal having a voltage transition. The output pulse starts after a fixed time period following the input signal transition. Circuit 22 produces an output pulse in response to an input transition and the pulse generated can be set to have any desired time duration.

The output of the one shot circuit 22 provides a second input to the exclusive-OR gate 46 and the D input to a flip-flop 24. The Q output of the flip-flop 24 provides a second input to the NAND gate 48 and the $\overline{Q}$ output of this flip-flop provides a first input to a NAND gate 50. Flip-flop 30 Q output provides a second input to the NAND gate 50 and the resulting output pulses generated by the NAND gate 50 are input to a counter 57.

The clock signal output of the local clock 10 is transferred through a variable delay 26 and a fixed delay 28 to the CLOCK inputs of flip-flops 24 and 30. In addition, the clock output of the variable delay 26 is connected to the CLEAR terminals of the flip-flops 24 and 30.

A transmit clock 32 provides the clock drive for a pseudo noise code generator 34 which generates an N-length digital code that is conveyed to a modulator 36. The output of the modulator 36 is provided to a summer 38 wherein the output is added to a noise signal generated by a variable amplitude noise generator 40. From the summer 38 the modulated signal is conveyed to a demodulator 42 which then transfers the demodulated pseudo noise code together with the added noise to register B of the correlator 16.

To initiate operation of the correlator error detector of FIG. 1 the load switch 14 is closed thereby causing the code generated by the pseudo noise code generator 12 to be shifted into register A of the correlator 16. The load switch 14 is then opened and the pseudo noise code is statically retained in the register A of the correlator.

Although the registers A and B of correlator 16 are of the same length M in bit capacity, they need not be as long as the N-length pseudo noise code. A system has been successfully operated in which the registers were only one-eight the length of the pseudo noise code used.

The pseudo noise code generator 34, which is driven by the transmit clock 32, generates an identical code sequence as that of pseudo noise code generator 12 but the rates of the two clock drivers differ. The digital code thus generated is conveyed to modulator 36 and then to the summer 38 where the modulated code is added with noise energy provided by the variable amplitude noise source 40. This combined pseudo noise code and noise signal is then demodulated and input to the register B of the correlator 16. Thus, the four units comprising modulator 36, summer 38, variable amplitude noise generator 40 and demodulator 42 simulate a noisy communications path such as a radio frequency link.

The combination pseudo noise code and noise from demodulator 42 is clocked through register B of the correlator 16 at the rate provided by the local clock 10. Within the correlator 16 each bit in register A is compared to its corresponding bit in register B through an exclusive-OR gate (not shown) and the outputs of the exclusive-OR gates are summed to generate the correlator output, as previously described. The pseudo noise code sequence produced by generator 34 is continuously repeated thereby causing it to align with the code stored in register A once for each cycle of the sequence. And, at the time the codes in register A and register B align, a correlation output pulse, as previously described, is generated.

In the threshold detector 44, a binary "one" output is generated whenever the correlation output exceeds a predetermined threshold.

The second input to the exclusive-OR gate 46 is a repeating pulse defined as a window pulse which corresponds in time to the correlation output pulse which should ideally be produced by the correlator 16. This window pulse is produced by dividing the clock output of the local clock 10 by the number of bits N in the pseudo noise code provided by the pseudo noise generators 12 and 34. This division takes place in the divide-by-N circuit 18 that provides an output to the one shot circuit 20. The variable delay of the one shot circuit 20 is adjusted to provide time correspondence between the window pulse and the correlation output pulse. The window pulse width is determined by the one shot circuit 22 and is adjusted to be approximately the same width as that of the correlation output pulses provided by the threshold detector 44. This window pulse is also provided to the D input of the flip-flop 24.

The exclusive-or gate 46 provides a binary "one" output when its inputs are at differing binary levels and this output is provided on line 47 to the D input of the flip-flop 30.

The local clock 10 output is provided to the clock inputs of the flip-flops 24 and 30 after having passed through a variable delay 26 and a fixed delay 28. Prior to each clock pulse input to the flip-flops, the clock output of the variable delay 26 clears both flip-flops 24 and 30. The CLEAR function sets the Q output at a binary "zero" level which sets the flip-flop 30 in preparation for sampling the D input once during each clock period. Activation of the flip-flops 24 and 30 is provided by the clock output of the fixed delay 28. The magnitude of this delay is set such that the flip-flop 30 is turned on during the center of the window pulse which is provided to the exclusive-OR gate 46. Thus the flip-flop 30 samples the output of the exclusive-OR gate 46 during the center of the correlation output pulse. This eliminates any problems caused by differences in the width of the correlation output pulse as compared to the width of the window pulse.

The window pulse output of the one shot circuit 22 is provided to the flip-flop 24 at the time of occurrence of the correlation output pulse corresponding to each cycle of the pseudo noise code provided by pseudo noise code generator 34.

Whenever the inputs to the exclusive-OR gate 46 are different there will be a binary "one" input to the D terminal of the flip-flop 30 and this condition will only occur when either of two error conditions exists. When the threshold detector provides a correlation output at a time when there is no window pulse, which corresponds in time with the theoretical time of a correlation output pulse, then the correlator 16 has produced a false output. If the threshold detector 44 does not provide an output when the window pulse is present, then correlator 16 has failed to produce a correlation output pulse corresponding to a particular code sequence. Thus each binary "one" output of the exclusive-OR gate 46 indicates that an error has occurred.

The error output pulses of the exclusive-OR gate 46 are provided to the D input of the flip-flop 30 which forces the Q output of this flip-flop to a binary "one" and when no error condition is present the Q output of flip-flop 30 will be a binary "zero". Thus the line 54 will have a pulse present at the occurrence of each error of either type.

The window pulse output of the one shot circuit 22 is provided to the D input of flip-flop 24 which forces the Q output of this flip-flop to a binary "one" for the corresponding clock period. The Q output of flip-flop 24 in turn provides the second input to the NAND gate 48. Thus the output of the NAND gate 48, which is normally a binary "one" will go to a binary "zero" for a one clock period whenever a correlation error occurs of the type wherein correlator 16 fails to produce a correlation output pulse at the proper time. These error output pulses are provided on line 52 to the counter 49.

The $\overline{Q}$ output of the flip-flop 24 is at a binary "one" level at all times except when the window pulse occurs and this $\overline{Q}$ output is one of the two inputs to the NAND gate 50. Thus, whenever an error pulse is generated on the line 54 at a time other than during the window pulse the output of the NAND gate 50 which is normally a binary "one" will go to a binary "zero". The pulse outputs of the NAND gate 50 correspond to errors wherein correlator 16 produces a correlation output pulse that does not correspond to a sequence of the pseudo noise code input, in other words, a false output.

The error outputs on lines 52, 54 and 56 can be either displayed to an operator or stored in the counters 49, 55 and 57 to determine error rates over a period of time.

Figure 2:
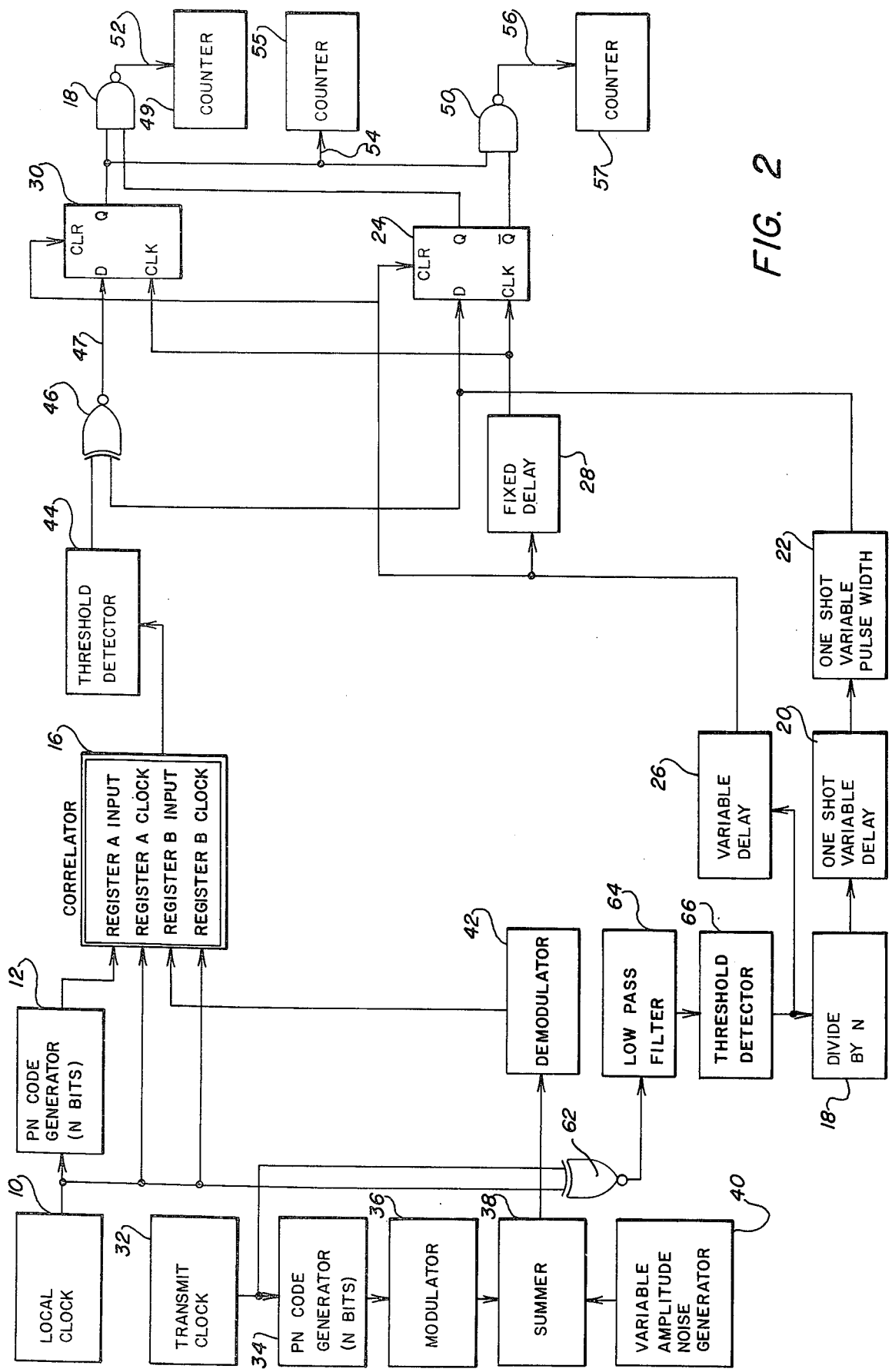
FIG. 2 is a block diagram of an alternative embodiment of the present invention.

An alternative embodiment of the present invention is shown in FIG. 2 and this embodiment is similar to that shown in FIG. 1 but with a number of exceptions as noted. Where applicable, the reference numbers remain the same. The load switch 14 has been omitted and replaced by a direct path. There is added an exclusive-OR gate 62 having the clock signal of local clock 10 and the clock signal of transmit clock 32 as inputs. Gate 62 generates an output which is transmitted through a low pass filter 64 to a threshold detector 66. The output of the threshold detector 66 is provided to the divide-by-N circuit 18. From the threshold detector 66 an output is also provided to the variable delay circuit 26. The remaining structure of the embodiment of FIG. 2 is the same as that in FIG. 1.

The code produced by the pseudo noise code generator 12 is provided as a continuous sequence signal to the register A input of the correlator 16. This sequence is shifted through register A by the clock signal from the local clock 10 which also provides the driving signal for register B in the correlator 16. Thus, the code sequences are clocked through the registers at the same rate.

As in the static embodiment of FIG. 1, the registers A and B of correlator 64 can be of substantially less length than the pseudo noise code utilized, as for example, 64 bit registers could be used with a 256 bit pseudo noise code.

Clock signals from both the local clock 10 and the transmit clock 32 are provided to the exclusive-OR gate 62 in order to produce a signal difined as a slip clock. The slip clock has a frequency which is the difference in the rates of the two clocks previously noted. A uniform clock rate signal is produced by passing the output of the exclusive-OR gate 62 through the low pass filter 64 and the threshold detector 66.

The slip clock is divided by N, the length of the pseudo noise code, in the circuit 18 to produce a pulse that occurs each time the pseudo noise code in registers A and B of correlator 16 align. A slipping effect is produced because the local clock 10 and transmit clock 32 operate at different rates. The subdivided clock signal from the divide-by-N circuit 18 is provided in sequence through the one shots circuits 20 and 22 to produce a window pulse as was described for the embodiment of FIG. 1.

As previously described the remaining circuitry produces on line 52 a downgoing binary "zero" output pulse for each error of the correlator 16 in failing to produce a correlation output pulse at the time when the pseudo noise codes in the two registers align. A downgoing binary "zero" error pulse is also generated on line 56 whenever the correlator 16 erroneously produces a correlation output pulse when the pseudo noise codes in the two registers are not aligned. Thus, an output pulse is produced on line 54 for each error of either type.

This circuit simulates and tests the spread spectrum synchronization technique whereby the locally generated pseudo noise code and the transmitted code are purposely compared at different rates in order to generate all possibilities of alignment between the two codes. At the time of alignment a correlation output pulse will be generatedand this will cause local clock and pseudo noise code generator to be locked to the incoming signal to provide continuous synchronization and decoding. The present apparatus provides a means for determining the level of noise that can be tolerated by the correlator and still produce synchronization as well as determining the time required to produce synchronization. The variable amplitude moise generator 40 is set to various amplitude levels and the error outputs on lines 52, 54 and 56 are recorded to produce a functional relationship that describes the performance of the correlator 16 in gaining synchronization. Both the capability of achieving synchronization and the time required to do so can be measured.

Figure 3:
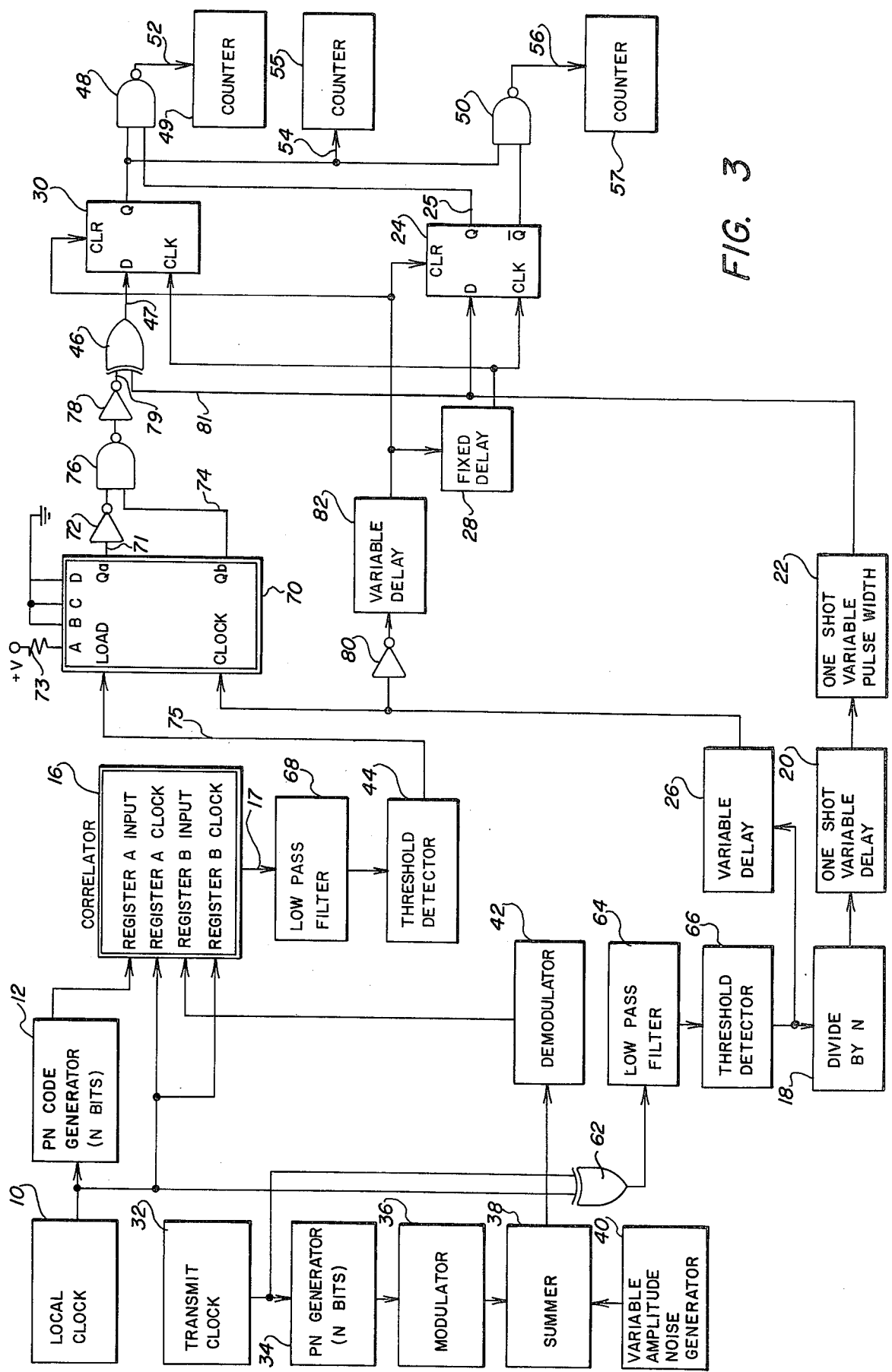
FIG. 3 is a block diagram of a further embodiment of the present invention.

The embodiment shown in FIG. 3 is similar to that described in FIG. 2 but with the addition of a number of components. Where applicable the reference numbers remain the same. A low pass filter 68 is included between the correlator 16 and the threshold detector 44. Between the threshold detector 44 and the exclusive-OR gate 46 there is added in series an UP/DOWN counter 70, an inverter 72, a NAND gate 76 and an inverter 78. The fnal added components are an inverter 80 in series with a variable delay 82 between the output of the variable delay 26 and the CLEAR input to the flip-flops 24 and 30.

Operation of the correlator 16 is the same as that described for the correlator in the embodiment of FIG. 2. A pseudo noise code is clocked through the register A of correlator 16 while the same code, but at a different rate, is clocked through register B of the correlator. The correlation outputs are passed through the low pass filter 68 to eliminate extraneous high frequency components, and a a result of this filtering the correlation pulses are lengthened.

Additional circuitry is provided for the embodiment of FIG. 3 to deal with the extended length correlation output pulses created by the low pass filter 68.

Figure 4:
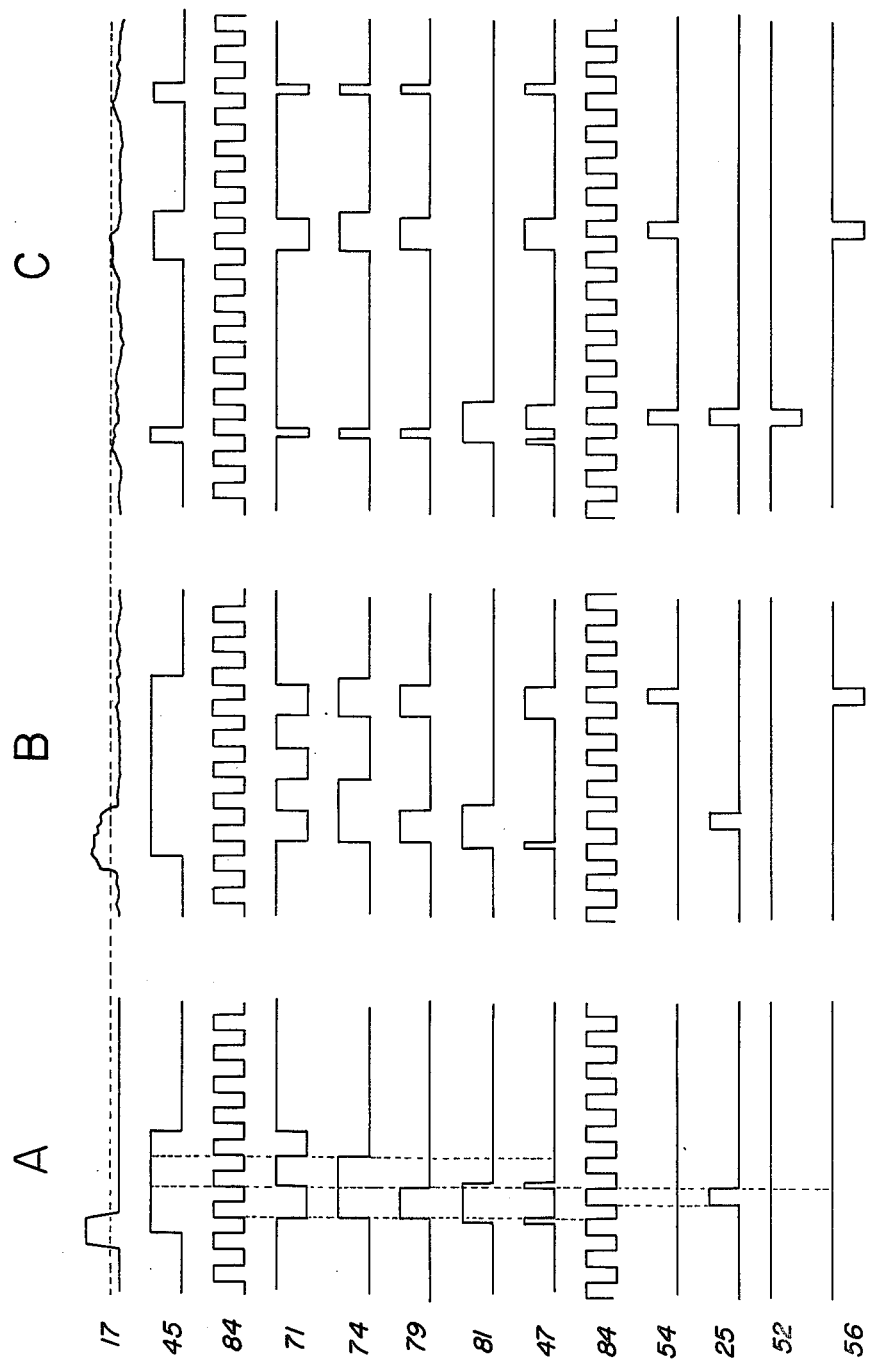
FIG. 4 is a selection of signal waveforms that are present in the embodiment of FIG. 3.

The waveforms shown in FIG. 4 correspond to the signals present on the corresponding numbered lines in FIGS. 1-3. The waveform on line 17 is the output of the correlator 16 in which column A shows an ideal correlation pulse, column B an actual pulse influenced by noise and column C shows a noise degraded true correlation pulse followed by two false correlation pulses. The line 45 waveform is the output of the threshold detector 44 wherein column A represents the embodiments of FIGS. 1 and 2 which do not have the low pass filter 68, and columns B and C represent FIG. 3 which does have the low pass filter. Line 84 carries the slip clock signal to the inverter 80 and UP/DOWN counter 70.

The UP/DOWN counter 70 in FIG. 3 has two control inputs, a load input and a clock input. Threshold detector 44 provides the load input and the clock input is the slip clock $Q_A$ and $Q_B$ which are preset by the voltage levels applied to the A and B inputs respectively. The $Q_A$ and $Q_B$ waveforms are shown on lines 71 and 74 respectively of FIG. 4. The A input is connected to a positive voltage level through a resistor 73 while the B input is grounded. Therefore the preset level for the outputs is a binary "one" for $Q_A$ and a binary "zero" for $Q_B$. Whenever the load input goes high, that is, to a binary "one", the outputs begin to count forward in sequence with the slip clock periods.

The $Q_A$ and $Q_B$ outputs of the UP/DOWN counter 70 count in binary from "1" to "3", then to "0" and back to "1" where the sequence is repeated. This is shown by the waveforms on lines 71 and 74 of FIG. 4. The $Q_A$ output is passed through the inverter 72 and provided as one input to the NAND gate 76 and the $Q_B$ output provides the second input to the NAND gate 76. Following this NAND gate is an inverter 78 which provides one input to the exclusive-OR gate 46. The output of inverter 78 is shown on line 79. With the above sequence there will be only one output of the NAND gate 76 for every fourth slip clock pulse and the single pulse output will be no longer than one slip clock period. Thus, if the correlation output of the threshold detector 44 is less than four slip clock periods long then only a single pulse will be output and this pulse is handled in the same manner in the exclusive-OR gate 44 as was described in the embodiment described in FIG. 2. Additional outputs of the UP/DOWN counter 70 may be utilized if it is desired to increase the maximum length correlation output pulse which will generate but a single slip clock width pulse.

The slip clock signal output of the variable delay 26 is passed through inverter 80 and variable delay 82 to provide the CLEAR functions for flip-flops 24 and 30 and through the delay 28 to the clock inputs to the flip-flops.

The window pulse as described above is carried by line 81 to the exclusive-OR gate 46, which produces the output shown for line 47. This line has a logic one when the inputs have differing binary levels. Flip-flop 30 is turned on in sequence with the slip clock signal on line 84 to sample the level on line 47. Various outputs of flip-flop 30 are shown on line 54 with each response representing an error produced by correlator 16 in either failing to produce a correct correlation output pulse or omitting to generate a correct correlation pulse.

Line 25 shows the output of flip-flop 24 which is a pulse corresponding to correct correlation outputs. Line 52 shows the output of NAND gate 48 which is a series of pulses representing missed correlation outputs. And, the NAND gate 50 output on line 56 generates a pulse for each false correlation output.

Through the use of the present invention a number of factors can be quantized. Among these factors are the quality of the correlator being tested, the effectiveness of a particular type of modulation, the effect of the length of the correlator register, the effectiveness of a particular pseudo noise code and the significance of varying the length of a code. Thus, through the measurement of these various parameters, an optimum system can be designed.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

What is claimed is:

1. Apparatus for detecting error states generated by a correlator during the process of correlating a static predetermined code sequence with an input signal that includes said code sequence, comprising:
   (a) first means for detecting a failure of said correlator to generate a correlation output pulse when said code sequence in said input signal is aligned in said correlator with said static predetermined code sequence, and
   (b) second means for detecting a generation of said correlation output pulse by said correlator when said code sequence in said input signal is not aligned in said correlator with said static predetermined code sequence.

2. Apparatus as recited in claim 1 including means for adding a noise signal to said input signal.

3. Apparatus as recited in claim 2 wherein said means for adding a noise signal comprises:
   (a) means for modulating said code sequence to produce a first modulated signal,
   (b) means for adding said noise signal to said first modulated signal to produce a second modulated signal, and
   (c) means for demodulating said second modulated signal to produce said input signal.

4. Apparatus as recited in claim 2 including means for varying the amplitude of said noise signal.

5. Apparatas as recited in claim 1 including means for generating a first pulse when said static predetermined code sequence is aligned in said correlator with said code sequence in said input signal.

6. Apparatus as recited in claim 5 wherein said means for generating a first pulse comprises:
   (a) means for generating a second pulsed signal for clocking said input signal,
   (b) means for generating a third pulsed signal at a rate determined by dividing the rate of said second pulsed signal by the number of elements comprising said predetermined code sequence, and
   (c) means for delaying the pulses of said third pulsed signal for a time period such that the pulses of said third pulsed signal occur when said static predetermined code sequence is aligned in said correlator with said predetermined code sequence in said input signal.

7. Apparatus as recited in claim 5 including a threshold detector generating a binary output signal responsive to said correlation output pulse.

8. Apparatus as recited in claim 7 wherein said first means comprises:
   (a) an exclusive-OR circuit responsive to said binary output signal and said first pulse,
   (b) means for generating a first error pulse by sampling the output of said exclusive-OR circuit at approximately the center of said first pulse, and
   (c) means for generating a second error pulse responsive to said first pulse and said first error pulse.

9. Apparatus as recited in claim 7 wherein said second means comprises:
   (a) an exclusive-OR circuit responsive to said binary output signal and said first pulse, (b) means for generating a first error pulse by sampling the output of said exclusive-OR circuit at approximately the center of said first pulse, and (c) means for generating a third error pulse responsive to said first pulse and said first error pulse.

10. Apparatus as recited in claim 8 including means for counting said first error pulses.

11. Apparatus as recited in claim 8 including means for counting said second error pulses.

12. Apparatus as recited in claim 9 including means for counting said third error pulses.

13. An apparatus for detecting error states generated by a correlator during the process of correlating a first signal that includes a predetermined code sequence with a second signal that includes said predetermined code sequence, comprising:

(a) first means for detecting a failure of said correlator to generate a correlation output pulse when said code sequence in said first signal is aligned in said correlator with said code sequence in said second signal, and (b) second means for detecting generation of said correlation output pulse by said correlator when said code sequence in said first signal is not aligned in said correlator with said code sequence in said second signal.

14. Apparatus as recited in claim 13 including means for adding a noise signal to said second signal.

15. Apparatus as recited in claim 14 including means for varying the amplitude of said noise signal.

16. Apparatus as recited in claim 14 wherein said means for adding a noise signal to said second signal comprises:

(a) means for modulating said second signal to produce a first modulated signal, (b) means for adding said first modulated signal to said noise signal to produce a second modulated signal, and (c) means for demodulating said second modulated signal.

17. Apparatus as recited in claim 13 including:

(a) means for generating a first periodic signal for clocking said first signal, (b) means for generating a second periodic signal for clocking said second signal, (c) means for producing a slip clock signal at a rate being the difference of the rates of said first periodic signal and said second periodic signal, and (d) means for generating a window pulse responsive to said slip clock signal, said window pulse occurring when said predetermined code sequence in said first signal is aligned in said correlator with said predetermined code sequence in said second signal.

18. Apparatus as recited in claim 17 wherein said means for producing a slip clock signal comprises:

(a) an exclusive-OR circuit having said first and said second periodic signals as inputs, (b) a low pass filter having the output of said exclusive-OR gate as an input, and (c) a threshold detector having the output of said low pass filter as an input and producing said slip clock signal as an output.

19. Apparatus as recited in claim 17 wherein said means for generating a window pulse comprises:

(a) means for generating a third periodic signal at a rate determined by dividing said slip clock signal rate by the number of elements comprising said predetermined code sequence, and (b) means for delaying said third periodic signal for a period of time such that said third periodic signal pulses occur when said predetermined code sequence in said first signal is aligned in said correlator with said predetermined code sequence in said second signal.

20. Apparatus as recited in claim 17 including a threshold detector generating a binary output signal responsive to said correlation output pulse.

21. Apparatus as recited in claim 20 wherein said first means comprises:

(a) an exclusive-OR circuit having said binary output signal and said window pulse as inputs, (b) means for sampling the output signal of said exclusive-OR gate at approximately the center of said window pulse to generate a first error pulse, and (c) means for generating a second error pulse responsive to said window pulse and said first error pulse.

22. Apparatus as recited in claim 20 wherein said second means comprises:

(a) an exclusive-OR gate having said binary output signal and said window pulse as inputs, (b) means for sampling the output signal of said exclusive-OR gate at approximately the center of said window pulse to generate a first error pulse, and (c) means for generating a third error pulse responsive to said window pulse and said first error pulse.

23. Apparatus as recited in claim 21 including means for counting said first error pulse.

24. Apparatus as recited in claim 21 including means for counting said second error pulse.

25. Apparatus as recited in claim 22 including means for counting said third error pulse.

26. An apparatus for detecting error states generated by a correlator during the process of correlating a first signal that includes a predetermined code sequence with a second signal that includes said predetermined code sequence, comprising:

(a) first means for detecting a failure of said correlator to generate a correlation output pulse when said code sequence in said first signal is aligned in said correlator with said code sequence in said second signal, (b) second means for detecting generation of said correlation output pulse by said correlator when said code sequence in said first signal is not aligned in said correlator with said code sequence in said second signal, (c) a threshold detector for generating a binary output signal responsive to said correlation output pulse, (d) a low pass filter disposed in the signal flow path between the output of said correlator and the input of said threshold detector, and (e) means for generating a predetermined duration error pulse responsive to said binary output signal.

27. Apparatus as recited in claim 26 including means for adding a noise signal to said second signal.

28. Apparatus as recited in claim 27 including means for varying the amplitude of said noise signal.

29. Apparatus as recited in claim 27 wherein said means for adding a noise signal to said second signal comprises:

(a) means for modulating said second signal to produce a first modulated signal, (b) means for adding said first modulated signal to said noise signal to produce a second modulated signal, and (c) means for demodulating said second modulated signal.

30. Apparatus as recited in claim 26 including:

(a) means for generating a first periodic signal for clocking said first signal, (b) means for generating a second periodic signal for clocking said second signal, (c) means for producing a slip clock signal at a rate being the difference of the rates of said first periodic signal and said second periodic signal, and (d) means for generating a window pulse responsive to said slip clock signal, said window pulse occurring when said predetermined code sequence in said first signal is aligned in said correlator with said predetermined code sequence in said third signal.

31. Apparatus as recited in claim 30 wherein said means for producing a slip clock signal comprises:

(a) an exclusive-OR circuit having said first and said second periodic signals as inputs, (b) a low pass filter having the output of said exclusive-OR gate as an input, said (c) a threshold detector having the output of said low pass filter as an input and producing said slip clock signal as an output.

32. Apparatus as recited in claim 30 wherein said means for generating a window pulse comprises:

(a) means for generating a third periodic signal at a rate determined by dividing said slip clock signal rate by the number of elements comprising said predetermined code sequence, and (b) means for delaying said third periodic signal for a period of time such that said third periodic signal pulses occur when said predetermined code sequence in said first signal is aligned in said correlator with said predetermined code sequence in said second signal.

33. Apparatus as recited in claim 30 wherein said first means comprises:

(a) an exclusive-OR circuit having said binary output signal and said window pulse as inputs, (b) means for sampling the output signal of said exclusive-OR gate at approximately the center of said window pulse to generate a first error pulse, and (c) means for generating a second error pulse responsive to said window pulse and said first error pulse.

34. Apparatus as recited in claim 30 wherein said second means comprises:

(a) an exclusive-OR gate having said binary output signal and said window pulse as inputs, (b) means for sampling the output signal of said exclusive-OR gate at approximately the center of said window pulse to generate a first error pulse, and (c) means for generating a third error pulse responsive to said window pulse and said first error pulse.

35. Apparatus as recited in claim 33 including means for counting said first error pulse.

36. Apparatus as recited in claim 33 including means for counting said second error pulse.

37. Apparatus as recited in claim 34 including means for counting said third error pulse.

38. Apparatus as recited in claim 30 wherein said means for generating a fixed duration error pulse comprises:

(a) an UP/DOWN counter having said binary output signal and said slip clock signal as inputs and generating a first count output signal and a second count output signal, and (b) means for generating said fixed duration error pulse responsive to a predetermined combination of said first count output signal and said second count output signal.

* * * * *